July 30, 1957 — A. N. EMMONS — 2,800,759
GRASS CUTTER BLADE MOUNTING
Filed Jan. 18, 1956

INVENTOR.
Arthur N. Emmons
BY D. Emmett Thompson
Attorney.

United States Patent Office 2,800,759
Patented July 30, 1957

2,800,759
GRASS CUTTER BLADE MOUNTING

Arthur N. Emmons, Nedrow, N. Y., assignor to The Porter-Cable Machine Company, Syracuse, N. Y., a corporation of New York Application January 18, 1956, Serial No. 559,891

2 Claims. (Cl. 56—25.4)

This invention relates to grass cutters of the type employing a horizontally disposed cutter or blade rotated at high speed about a vertically extending axis.

More particularly, the invention has to do with the structural arrangement for mounting the cutter blade on the power shaft, the invention having as an object a particularly simple arrangement economical to manufacture and assemble, and which functions to prevent long grass from winding up around the power shaft.

The invention consists in the novel features and in the combinations and constructions hereinafter set forth and claimed.

In describing this invention, reference is had to the accompanying drawings in which like characters designate corresponding parts in all the views.

In the drawings—

Figure 1:
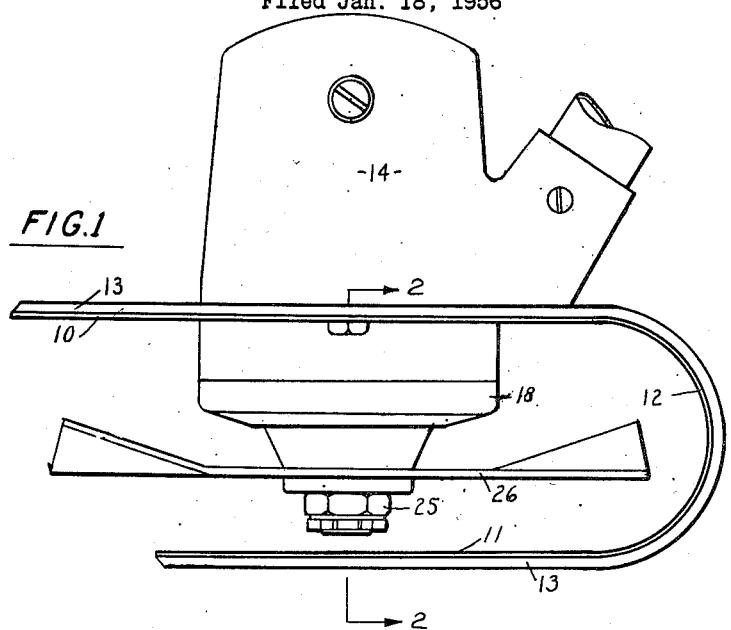
Figure 1 is a side elevational view of a grass cutter embodying my invention with a portion of the handle broken away.
Figure 2:
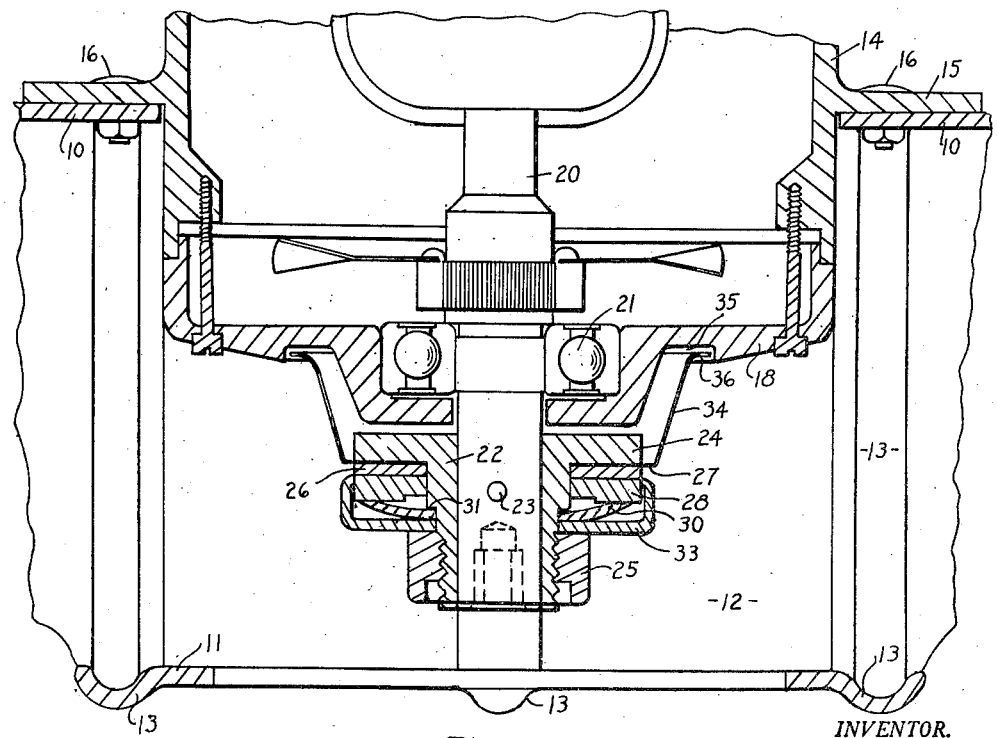
Figure 2 is a enlarged vertical sectional view taken on line 2—2, Figure 1.

The grass cutter here shown and described is of the type used mainly for trimming grass, as around trees, shrubs, walls, etc. It is relatively small and light weight.

The device consists of a frame, here shown of integral construction having upper and lower horizontally extending plate sections 10, 11, connected at like ends by a curved portion 12. The frame may be formed with one or more ribs or corrugations 13 to provide proper rigidity. The top plate 10 is of greater width than the lower plate 11 and may also be formed along its side edges with the ribs 13.

The upper plate section 10 of the frame is apertured to receive a motor housing 14 provided with a radially extending flange 15 overlying the plate 10 and being detachably secured thereto, as by bolts 16. The motor housing 14 is vertically disposed, and is provided at its lower end with an end closure shell 18. The motor or power shaft 20 is journalled vertically in the housing, the lower portion being mounted in a bearing 21 mounted in the end shell 18 with the shaft depending therefrom. A collar member 22 is fixedly secured to the depending portion of the shaft, as by a pin 23. The collar is formed at its upper end with a radially extending flange 24, and is threaded at its lower end to receive a clamping nut 25 of the self-locking type.

A cutter bar 26 is positioned on the collar 22, and a cup-shaped member, having a central discoidal portion 27, is positioned on the collar intermediate the cutter bar 26 and the flange 24 of the collar. A washer 28 is positioned against the under side of the cutter bar and is engaged by a dished spring washer 30. The central portion of the washer 30 is positioned against a shoulder 31 formed on the collar. A second cup-shaped member 33 is positioned on the collar intermediate the washer 30 and the nut 25, the arrangement being such that when the nut is tightened, the member 33 clamps the central portion of the dished spring washer 30 against the shoulder 31, the peripheral portion of the washer 30 engaging the free washer 28, and compressing it axially against the blade 26 and, in turn, clamping the discoidal portion 27 of the cup-shaped member against the collar flange 24.

The cup-shaped member is formed with an upwardly extending conical portion 34, the upper edge of which is positioned in an annular recess 35 formed in the lower surface of the end shell 18. The upper edge of the cup-shaped member is flared outwardly to form a radial flange 36 terminating in close proximity to the outer wall of the recess 35 and being positioned somewhat upwardly from the lower surface of the end shell.

With this arrangement, the cup-shaped member 34 rotates with the cutter bar mounting assembly, enclosing the flange 24 and the clearance space between the flange and the end shell 18. Accordingly, the cup-shaped member serves to prevent long grass, and other fibrous material, from drawing in the space between the flange 24 and the end closure shell and winding up about the rotating unit of the cutter.

What I claim is:

1. A grass cutter comprising a frame, a housing vertically disposed on the frame and being provided at its lower end with an end closure shell, a power shaft journalled vertically in said shell and having a portion depending therefrom, said end shell being formed in its lower surface with an annular recess arranged concentrically with said shaft, a collar member fixedly secured to said shaft and being provided at its upper end with a radially extending flange, a cutter mounted on said collar member, a cup-shaped member having a central discoidal portion mounted on said collar member intermediate said flange and said cutter, said cup-shaped member having a conical side wall portion extending upwardly from said flange and flaring outwardly from the axis of said shaft, the upper edge of said conical portion being formed with an outwardly extending radial portion mounted for rotation within said annular recess, and means cooperable to clamp said cutter against the discoidal portion of said cup and to clamp the latter against said flange.

2. A grass cutter comprising a frame, a housing vertically disposed on the frame and being provided at its lower end with an end closure shell, a power shaft journalled vertically in said shell and having a portion depending therefrom, said end shell being formed in its lower surface with an annular recess arranged concentrically with said shaft, a collar member fixedly secured to said shaft and being formed at its upper end with a radially extending flange, the lower end portion of said collar being threaded externally, a cutter bar mounted on said collar member, a cup-shaped member having a central discoidal portion mounted on said collar member intermediate said flange and said cutter bar, said cup-shaped member having a conical side wall portion extending upwardly from said collar flange and flaring outwardly from the axis of said shaft, the upper edge of said cup-shaped member being formed with an outwardly extending radial flange positioned for rotation within said annular recess in said end shell, a free washer mounted on said collar member for engagement with the under side of said cutter bar, a second cup-shaped member mounted on said collar and having an upstanding cylindrical flange portion encircling the periphery of said free washer and terminating in close proximity to the under side of said cutter bar, a dished spring washer mounted on said collar member within said second cup member, a nut threaded on the lower end portion of said collar member for engagement with said second cup member to move the same axially against said dished washer to effect compression of said loose washer against said cutter bar to clamp the same against the discoidal portion of said first cup member and to clamp the latter against the flange of said collar member.

References Cited in the file of this patent
UNITED STATES PATENTS

| | | |
|---|---|---|
| 2,539,619 | Goodall | Jan. 30, 1951 |
| 2,651,530 | Blydenburgh | Sept. 8, 1953 |